US011971043B2

(12) United States Patent
Steiner et al.

(10) Patent No.: US 11,971,043 B2
(45) Date of Patent: Apr. 30, 2024

(54) COMPACT VARIABLE GEOMETRY DIFFUSER MECHANISM

(71) Applicant: Johnson Controls Tyco IP Holdings LLP, Milwaukee, WI (US)

(72) Inventors: Jordan Q. Steiner, York, PA (US); Paul W. Snell, York, PA (US)

(73) Assignee: TYCO FIRE & SECURITY GmbH, Schaffhausen (CH)

( * ) Notice: Subject to any disclaimer, the term of this patent is extended or adjusted under 35 U.S.C. 154(b) by 0 days.

(21) Appl. No.: 17/893,009

(22) Filed: Aug. 22, 2022

(65) Prior Publication Data

US 2023/0050726 A1 Feb. 16, 2023

Related U.S. Application Data

(63) Continuation of application No. 16/650,277, filed as application No. PCT/US2018/052254 on Sep. 21, 2018, now Pat. No. 11,421,699.

(60) Provisional application No. 62/562,682, filed on Sep. 25, 2017.

(51) Int. Cl.
*F04D 27/02* (2006.01)
*F04D 29/46* (2006.01)

(52) U.S. Cl.
CPC ....... *F04D 27/0246* (2013.01); *F04D 29/464* (2013.01); *F05D 2250/52* (2013.01)

(58) Field of Classification Search
CPC .. F04D 27/0246; F04D 29/464; F04D 29/056; F05D 2250/52; F05D 2240/50
See application file for complete search history.

(56) References Cited

U.S. PATENT DOCUMENTS

| | | | |
|---|---|---|---|
| 2,770,106 | A | 3/1955 | Moody |
| 2,921,445 | A | 1/1960 | Ashley et al. |
| 3,149,478 | A | 9/1964 | Anderson et al. |

(Continued)

FOREIGN PATENT DOCUMENTS

| | | |
|---|---|---|
| CN | 1336527 | 2/2002 |
| CN | 1745253 | 3/2006 |

(Continued)

OTHER PUBLICATIONS

International Search Report and Written Opinion for International Patent Application No. PCT/US2018/052254 dated Dec. 10, 2018, pp. 1-14.

*Primary Examiner* — David E Sosnowski
*Assistant Examiner* — Wayne A Lambert
(74) *Attorney, Agent, or Firm* — Fletcher Yoder, PC

(57) ABSTRACT

A diffuser system for a centrifugal compressor is provided. The diffuser system includes a nozzle base plate that defines a diffuser gap, support blocks, and a drive ring rotatable relative to the support blocks. The drive ring includes cam tracks and bearing assemblies positioned proximate an outer circumference of the drive ring. The diffuser system further includes drive pins extending through the support blocks and the nozzle base plate. The first end of each drive pin includes a cam follower mounted into a cam track on the drive ring. The second end of each drive pin is coupled to a diffuser ring. Rotation of the drive ring causes axial movement of the drive pins by movement of the cam followers in the cam tracks. This results in movement of the diffuser ring to control fluid flow through the diffuser gap.

20 Claims, 11 Drawing Sheets

(56) References Cited

U.S. PATENT DOCUMENTS 3,362,625 A 1/1968 Endress
3,478,955 A 11/1969 Kunderman
3,645,112 A 2/1972 Mount et al.
3,990,809 A * 11/1976 Young .................. F01D 17/162 74/96
4,035,101 A * 7/1977 Glenn .................. F01D 17/162 415/160
4,395,197 A 7/1983 Yoshinaga et al.
4,544,325 A 10/1985 Rogo et al.
4,715,731 A 12/1987 Tittizer
4,718,819 A 1/1988 Rogo et al.
4,932,835 A 6/1990 Sorokes
5,116,197 A 5/1992 Snell
5,683,223 A 11/1997 Harada et al.
5,851,103 A 12/1998 Harada et al.
5,947,680 A 9/1999 Harada et al.
6,032,472 A 3/2000 Heinrichs et al.
6,070,421 A 6/2000 Petrovich et al.
6,158,956 A 12/2000 Arnold
6,237,353 B1 5/2001 Sishtla et al.
6,419,464 B1 7/2002 Arnold
6,460,371 B2 10/2002 Kawada
6,506,031 B2 1/2003 Sishtla
6,814,540 B2 11/2004 Sishtla et al.
6,857,845 B2 2/2005 Stabley et al.
6,872,050 B2 3/2005 Nenstiel
6,928,818 B1 8/2005 Arnold et al.
7,181,928 B2 2/2007 de Larminat
7,326,027 B1 2/2008 Skoch et al.
7,356,999 B2 4/2008 Bodell, II et al.
7,824,148 B2 11/2010 Tetu et al.
7,905,102 B2 3/2011 Bodell, II et al.
7,905,702 B2 3/2011 Stabley et al.
8,021,127 B2 9/2011 De Larminat
8,033,782 B2 10/2011 Tapper
8,177,491 B2 5/2012 Noelle et al.
8,397,534 B2 3/2013 Doty et al.
8,424,339 B2 4/2013 Sommer
8,434,323 B2 5/2013 Welch et al.
8,465,265 B2 6/2013 De Larminat
8,516,850 B2 8/2013 Jadric et al.
8,567,207 B2 10/2013 Sommer et al.
8,876,469 B2 11/2014 Sarri et al.
8,931,304 B2 1/2015 Beers
8,956,110 B2 2/2015 Shioda et al.
8,959,950 B2 2/2015 Doty et al.
9,121,408 B2 9/2015 Shioda et al.
9,243,648 B2 1/2016 Clemons et al.
9,284,851 B2 * 3/2016 Takaoka ................ F04D 29/563
9,291,166 B2 3/2016 De Larminat et al.
9,291,167 B2 3/2016 Schreiber
9,651,053 B2 * 5/2017 Eleftheriou ........... F01D 17/105
9,732,756 B2 8/2017 An et al.
10,378,553 B2 8/2019 Sommer et al.
10,823,198 B2 * 11/2020 Sishtla .................. F04D 29/462
2004/0109757 A1 6/2004 Nenstiel
2007/0154301 A1 7/2007 Hartmann et al.
2007/0271956 A1 11/2007 Smith et al.
2008/0232950 A1 9/2008 Stabley et al.
2010/0006265 A1 1/2010 De Larminat et al.
2010/0129204 A1 5/2010 Higashimori et al.
2010/0150701 A1 * 6/2010 Simon .................. F01D 17/165 415/160
2010/0172745 A1 7/2010 Hodder
2011/0318182 A1 12/2011 Jeong et al.
2013/0302184 A1 11/2013 Sishtla
2014/0057103 A1 2/2014 Mozsgai et al.
2014/0096663 A1 4/2014 Coakley
2014/0328667 A1 11/2014 Sommer et al.
2015/0053060 A1 2/2015 Coakley
2017/0260987 A1 9/2017 Onodera

FOREIGN PATENT DOCUMENTS

CN 104100573 10/2014
EP 1119732 8/2001
JP S54133613 10/1979
JP H07310697 11/1995
JP 2009174350 8/2009
KR 20170068160 6/2017
WO 2013039572 3/2013
WO 2014039155 3/2014
WO 2014084989 6/2014
WO 2014089551 6/2014
WO 2014117015 7/2014
WO 2014200476 12/2014
WO 2015053939 4/2015

* cited by examiner

COMPACT VARIABLE GEOMETRY DIFFUSER MECHANISM

CROSS-REFERENCE TO RELATED PATENT APPLICATIONS

This is a continuation application of U.S. patent application Ser. No. 16/650,277, entitled "COMPACT VARIABLE GEOMETRY DIFFUSER MECHANISM," filed Mar. 24, 2020, which is a U.S. National Stage Application of International Patent Application No. PCT/US2018/052254, entitled "COMPACT VARIABLE GEOMETRY DIFFUSER MECHANISM," filed Sep. 21, 2018, which claims the benefit of and priority to U.S. Provisional Patent Application No. 62/562,682, entitled "COMPACT VARIABLE GEOMETRY DIFFUSER MECHANISM," filed Sep. 25, 2017, each of which is hereby incorporated by reference in its entirety for all purposes.

BACKGROUND

Buildings can include heating, ventilation and air conditioning (HVAC) systems.

SUMMARY

One implementation of the present disclosure is a diffuser system for a centrifugal compressor. The diffuser system includes a nozzle base plate that defines a diffuser gap, support blocks, and a drive ring rotatable relative to the support blocks. The drive ring includes cam tracks and bearing assemblies positioned proximate an outer circumference of the drive ring. The diffuser system further includes drive pins extending through the support blocks and the nozzle base plate. The first end of each drive pin includes a cam follower mounted into a cam track on the drive ring. The second end of each drive pin is coupled to a diffuser ring. Rotation of the drive ring causes axial movement of the drive pins by movement of the cam followers in the cam tracks. This results in movement of the diffuser ring to control fluid flow through the diffuser gap.

The bearing assemblies may include an axial bearing assembly and a radial bearing assembly. The radial bearing assembly may include a roller member in contact with the outer circumferential surface of the drive ring. The roller member may resist radial movement of the drive ring as it rotates. The drive may include a second set of cam tracks. The axial bearing assembly may include a bearing member mounted into one of the second set of cam tracks. The bearing member may resist axial movement of the drive ring as it rotates. The second set of cam tracks may be parallel to the top and bottom surfaces of the drive ring. The other set of cam tracks may be inclined relative to the top and bottom surfaces of the drive ring. The second position of the diffuser ring may fully close the diffuser gap and may prevent a flow of fluid through the diffuser gap.

Another implementation of the present disclosure is system for a variable capacity centrifugal compressor for compressing a fluid. The system includes a housing, an impeller rotatably mounted in the housing for compressing fluid introduced through an inlet, and a diffuser system mounted in the housing and configured to stabilize a flow of fluid exiting the impeller. The diffuser system includes a nozzle base plate that defines a diffuser gap, support blocks, and a drive ring rotatable relative to the support blocks. The drive ring includes cam tracks and bearing assemblies positioned proximate an outer circumference of the drive ring. The diffuser system further includes drive pins extending through the support blocks and the nozzle base plate. The first end of each drive pin includes a cam follower mounted into a cam track on the drive ring. The second end of each drive pin is coupled to a diffuser ring. Rotation of the drive ring causes axial movement of the drive pins by movement of the cam followers in the cam tracks. This results in movement of the diffuser ring to control fluid flow through the diffuser gap.

The bearing assemblies may include an axial bearing assembly and a radial bearing assembly. The radial bearing assembly may include a roller member in contact with the outer circumferential surface of the drive ring. The roller member may resist radial movement of the drive ring as it rotates. The drive may include a second set of cam tracks. The axial bearing assembly may include a bearing member mounted into one of the second set of cam tracks. The bearing member may resist axial movement of the drive ring as it rotates. The second position of the diffuser ring may fully close the diffuser gap and may prevent a flow of fluid through the diffuser gap. The impeller may be a high specific speed impeller. The fluid may be a refrigerant. The refrigerant may be R1233zd.

Yet another implementation of the present disclosure is a diffuser system for a centrifugal compressor. The diffuser system includes a nozzle base plate that cooperates with an opposed interior surface to define a diffuser gap, support blocks, and a drive ring rotatable relative to the support blocks. The drive ring includes cam tracks. The diffuser system further includes bearing assemblies that are positioned on an outer circumferential surface of the drive ring and resist movement of the drive ring in both a radial direction and an axial direction. The diffuser system further includes drive pins extending through the support blocks and the nozzle base plate. The first end of each drive pin includes a cam follower mounted into a cam track on the drive ring. The second end of each drive pin is coupled to a diffuser ring.

The bearing assemblies may include V-groove bearing assemblies having an outer ring and an inner ring. The outer ring includes two flanges extending in a V-shape. The inner ring permits rotation of the outer ring relative to the inner ring. The drive ring may include a base portion and an extension portion situated orthogonally relative to each other. The extension portion may contact the two flanges of the outer ring.

DETAILED DESCRIPTION

Figure 1:
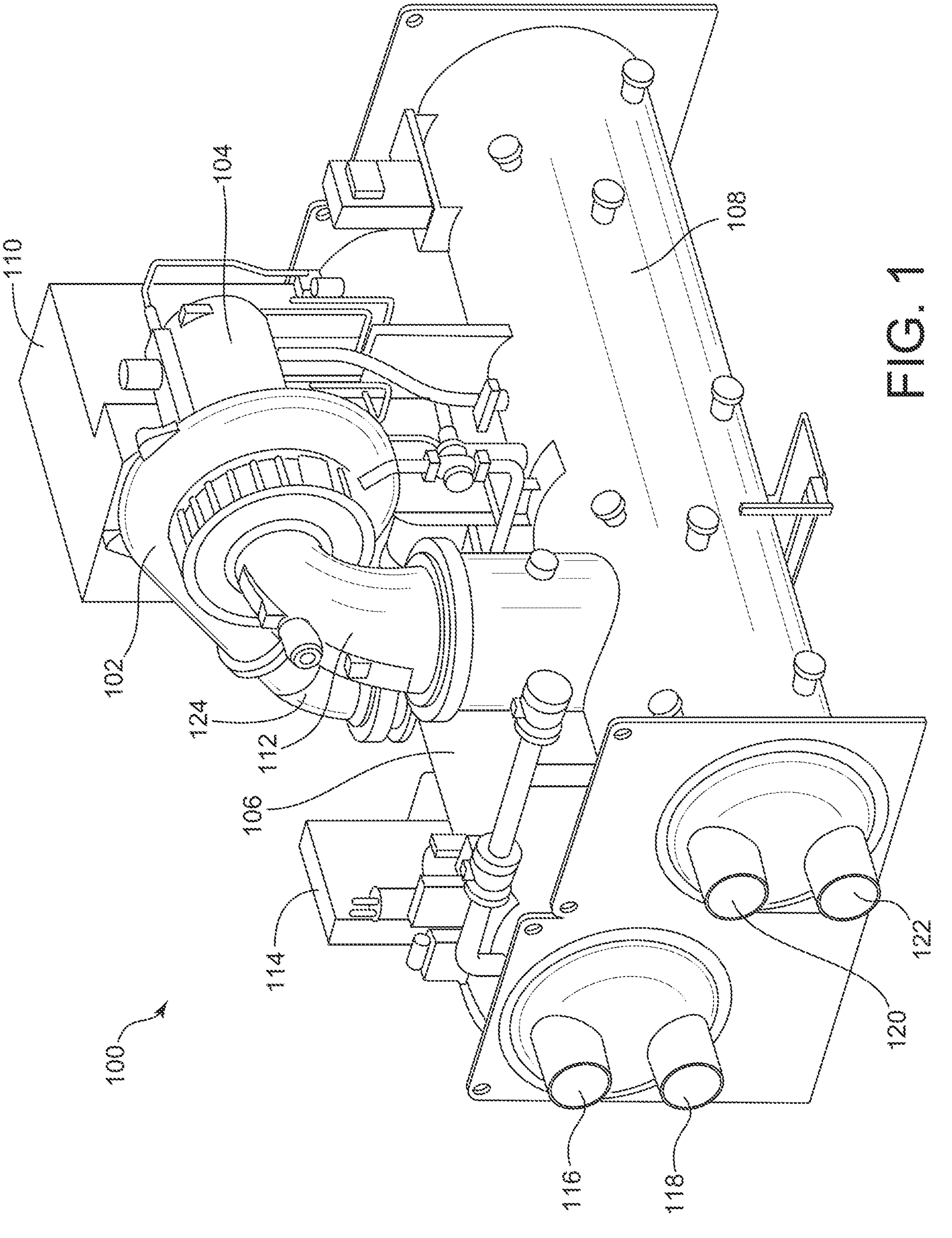
FIG. 1 is a perspective view drawing of a chiller assembly, according to some embodiments.

Referring generally to the FIGURES, a compact variable geometry diffuser (VGD) for use with an impeller in a centrifugal compressor in a chiller assembly is shown. Centrifugal compressors are useful in a variety of devices that require a fluid to be compressed, such as chillers. In order to effect this compression, centrifugal compressors utilize rotating components in order to convert angular momentum to static pressure rise in the fluid.

A centrifugal compressor can include four main components: an inlet, an impeller, a diffuser, and a collector or volute. The inlet can include a simple pipe that draws fluid (e.g., a refrigerant) into the compressor and delivers the fluid to the impeller. In some instances, the inlet may include inlet guide vanes that ensure an axial flow of fluid to the impeller inlet. The impeller is a rotating set of vanes that gradually raise the energy of the fluid as it travels from the center of the impeller (also known as the eye of the impeller) to the outer circumferential edges of the impeller (also known as the tips of the impeller). Downstream of the impeller in the fluid path is the diffuser mechanism, which act to decelerate the fluid and thus convert the kinetic energy of the fluid into static pressure energy. Upon exiting the diffuser, the fluid enters the collector or volute, where further conversion of kinetic energy into static pressure occurs due to the shape of the collector or volute. In some implementations, the collector or volute is integrally formed with a scroll component, and the scroll component can house the other components of the compressor, for example, the impeller and the diffuser.

The diffuser mechanism may be a variable geometry diffuser (VGD) mechanism with a diffuser ring movable between a first retracted position in which flow through a diffuser gap is unobstructed and a second extended position in which the diffuser ring extends into the diffuser gap to alter the fluid flow through the diffuser gap. It is often desirable to vary the amount of fluid flowing through the compressor or the pressure differential created by the compressor. For example, when the flow of fluid through the compressor is decreased, and the same pressure differential is maintained across the impeller, the fluid flow through the compressor may become unsteady. Some of the fluid may stall within the compressor and pockets of stalled fluid may start to rotate with the impeller. These stalled pockets of fluid may be problematic due to the noise, vibration, and reduction in efficiency they cause in the compressor, resulting in a condition known as rotating stall or incipient surge. If fluid flow is further decreased, the fluid flow may become even more unstable, and even causing a complete reversal of fluid flow known as surge. Surge is characterized by fluid alternately flowing backward and forward through the compressor, and may result in pressure spikes and damage to the compressor in addition to noise, vibration, and a reduction in compressor efficiency.

By varying the geometry of the diffuser at the impeller exit, the undesirable effects of rotating stall, incipient surge, and surge may be minimized. When operating at a low fluid flow rate, the diffuser ring of the VGD mechanism can be actuated to decrease the size of the diffuser gap at the impeller exit. The decreased area prevents fluid stall and surge back through the impeller. When a fluid flow rate is increased, the diffuser ring of the VGD mechanism can be actuated to increase the size of the diffuser gap to provide a larger area for additional flow. The VGD mechanism may also be adjusted in response to a change in pressure differential created by the compressor. For example, when the pressure differential is increased, the diffuser ring of the VGD mechanism can be actuated to decrease the size of the diffuser gap to prevent fluid stall and surge. Conversely, when the pressure differential is increased, the diffuser ring of the VGD mechanism can be actuated to increase the size of the diffuser gap to provide a larger area at the impeller exit. In addition to preventing stall and surge, the VGD mechanism may additionally be utilized for capacity control, minimization of compressor backspin and associated transient loads during compressor backspin, and minimization of start-up transients.

The type of impeller selected for the compressor may have design implications for the other components of the compressor, particularly the VGD mechanism. For example, a typical ratio of a tip diameter of the impeller to an eye diameter of the impeller may range from 1.5 to 3.0, with a ratio of 1.5 representative of a higher specific speed-type impeller, and a ratio of 3.0 representative of a lower specific speed-type impeller. In other words, when a higher specific speed impeller is used in the centrifugal compressor, the central inlet of the impeller is larger relative to the outer diameter of the impeller. Low specific speed-type impellers develop hydraulic head primarily through centrifugal force, while high specific speed-type impellers develop head through both centrifugal force and axial force. Because the central inlet or eye of the impeller may be located proximate certain components of the VGD mechanism, a high specific speed-type impeller may encroach upon space that would be otherwise reserved for the VGD mechanism. Thus, a VGD mechanism design that maximizes the amount of space available for mounting the impeller within the compressor can be useful.

Figure 2:
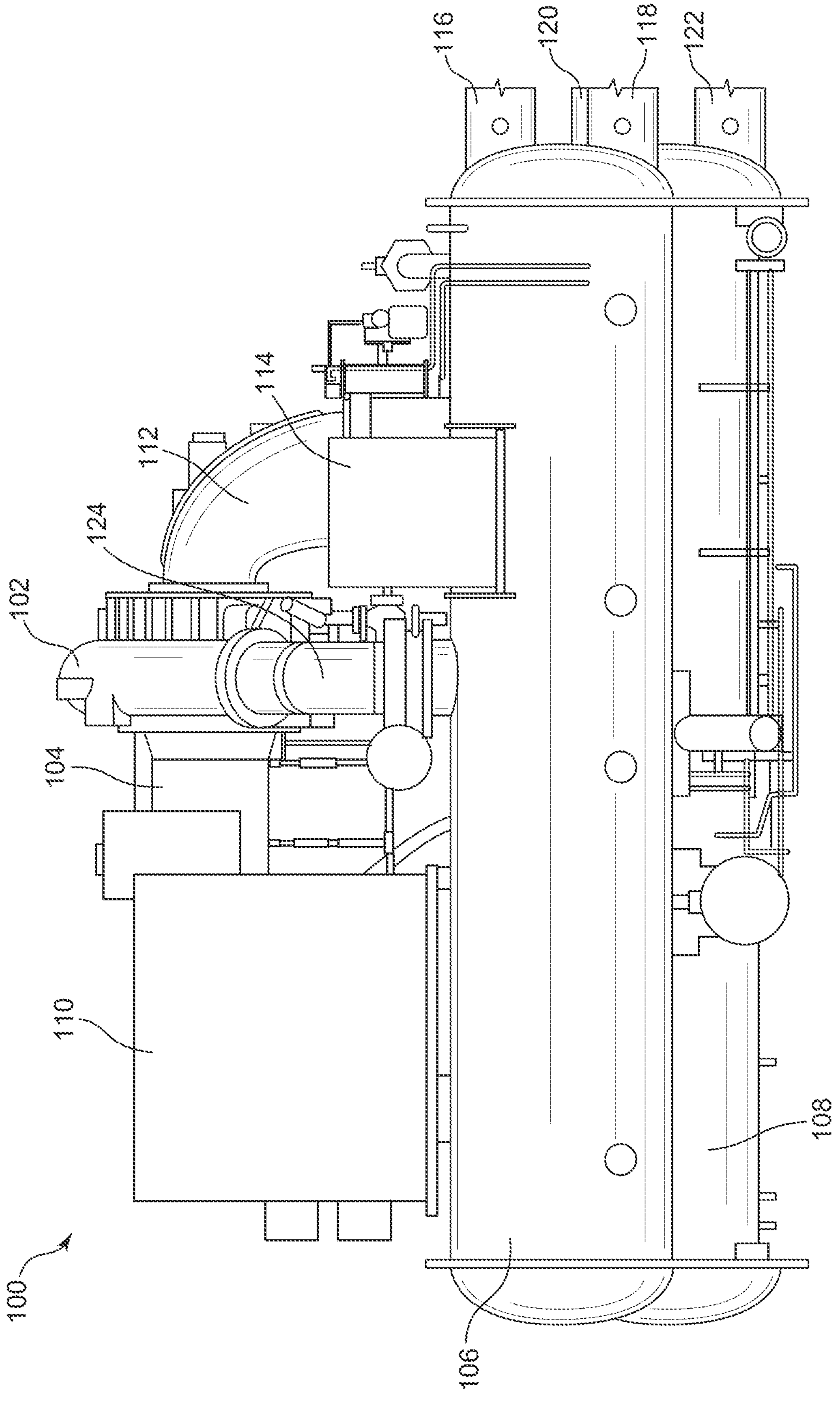
FIG. 2 is an elevation view drawing of the chiller assembly of FIG. 1, according to some embodiments.

Referring to FIGS. 1-2, an example implementation of a chiller assembly 100 is depicted. Chiller assembly 100 is shown to include a compressor 102 driven by a motor 104, a condenser 106, and an evaporator 108. A refrigerant is circulated through chiller assembly 100 in a vapor compression cycle. Chiller assembly 100 can also include a control panel 114 to control operation of the vapor compression cycle within chiller assembly 100.

Motor 104 can be powered by a variable speed drive (VSD) 110. VSD 110 receives alternating current (AC) power having a particular fixed line voltage and fixed line frequency from an AC power source (not shown) and provides power having a variable voltage and frequency to motor 104. Motor 104 can be any type of electric motor than can be powered by a VSD 110. For example, motor 104 can be a high speed induction motor. Compressor 102 is driven by motor 104 to compress a refrigerant vapor received from evaporator 108 through suction line 112 and to deliver refrigerant vapor to condenser 106 through a discharge line 124. Compressor 102 can be a centrifugal compressor, a screw compressor, a scroll compressor, a turbine compressor, or any other type of suitable compressor. In the implementations depicted in the FIGURES, compressor 102 is a centrifugal compressor.

Evaporator 108 includes an internal tube bundle (not shown), a supply line 120 and a return line 122 for supplying and removing a process fluid to the internal tube bundle. The supply line 120 and the return line 122 can be in fluid communication with a component within a HVAC system (e.g., an air handler) via conduits that that circulate the process fluid. The process fluid is a chilled liquid for cooling a building and can be, but is not limited to, water, ethylene glycol, calcium chloride brine, sodium chloride brine, or any other suitable liquid. Evaporator 108 is configured to lower the temperature of the process fluid as the process fluid passes through the tube bundle of evaporator 108 and exchanges heat with the refrigerant. Refrigerant vapor is formed in evaporator 108 by the refrigerant liquid delivered to the evaporator 108 exchanging heat with the process fluid and undergoing a phase change to refrigerant vapor.

Refrigerant vapor delivered by compressor 102 to condenser 106 transfers heat to a fluid. Refrigerant vapor condenses to refrigerant liquid in condenser 106 as a result of heat transfer with the fluid. The refrigerant liquid from condenser 106 flows through an expansion device (not shown) and is returned to evaporator 108 to complete the refrigerant cycle of the chiller assembly 100. Condenser 106 includes a supply line 116 and a return line 118 for circulating fluid between the condenser 106 and an external component of the HVAC system (e.g., a cooling tower). Fluid supplied to the condenser 106 via return line 118 exchanges heat with the refrigerant in the condenser 106 and is removed from the condenser 106 via supply line 116 to complete the cycle. The fluid circulating through the condenser 106 can be water or any other suitable liquid.

In some embodiments, the refrigerant has an operating pressure of less than 400 kPa or approximately 58 psi. In further embodiments, the refrigerant is R1233zd. R1233zd is a non-flammable fluorinated gas with low Global Warming Potential (GWP) relative to other refrigerants utilized in commercial chiller assemblies. GWP is a metric developed to allow comparisons of the global warming impacts of different gases, by quantifying how much energy the emissions of 1 ton of a gas will absorb over a given period of time, relative to the emissions of 1 ton of carbon dioxide.

Figure 3:
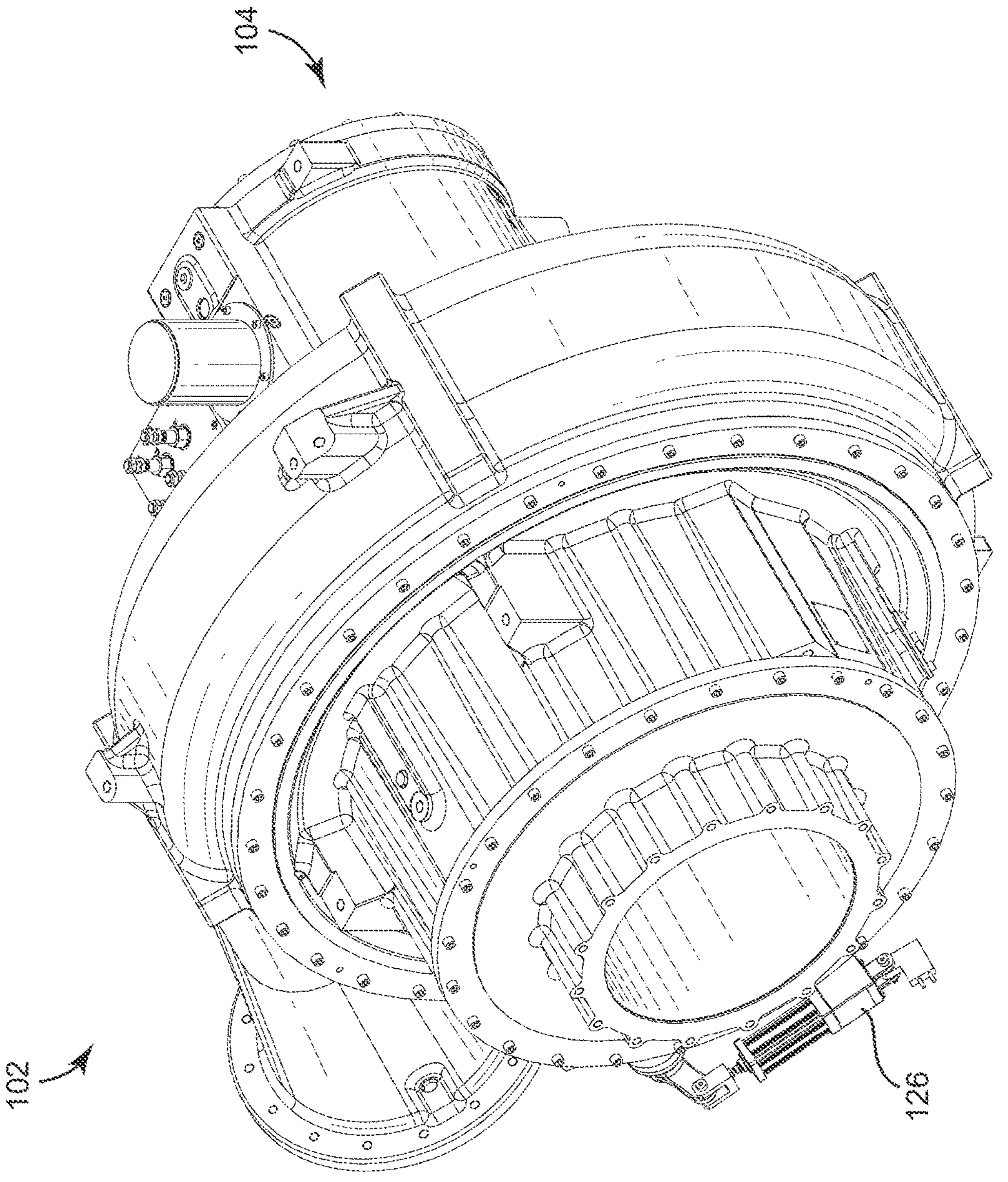
FIG. 3 is a perspective view of a compressor and motor assembly that may be used in the chiller assembly of FIG. 1, according to some embodiments.

Turning now to FIG. 3, a perspective view of a compressor 102 and motor 104 is depicted. As shown, an actuator 126 may be positioned proximate an exterior surface of the compressor 102. The actuator 126 may be any suitable type of actuator or actuating means that is capable of coupling to a VGD for the purpose of rotating a drive ring. In some embodiments, the actuator 126 is coupled to the VGD using a series of linkages. Further details of the rotation of the drive ring are included below with reference to FIG. 7.

Figure 4:
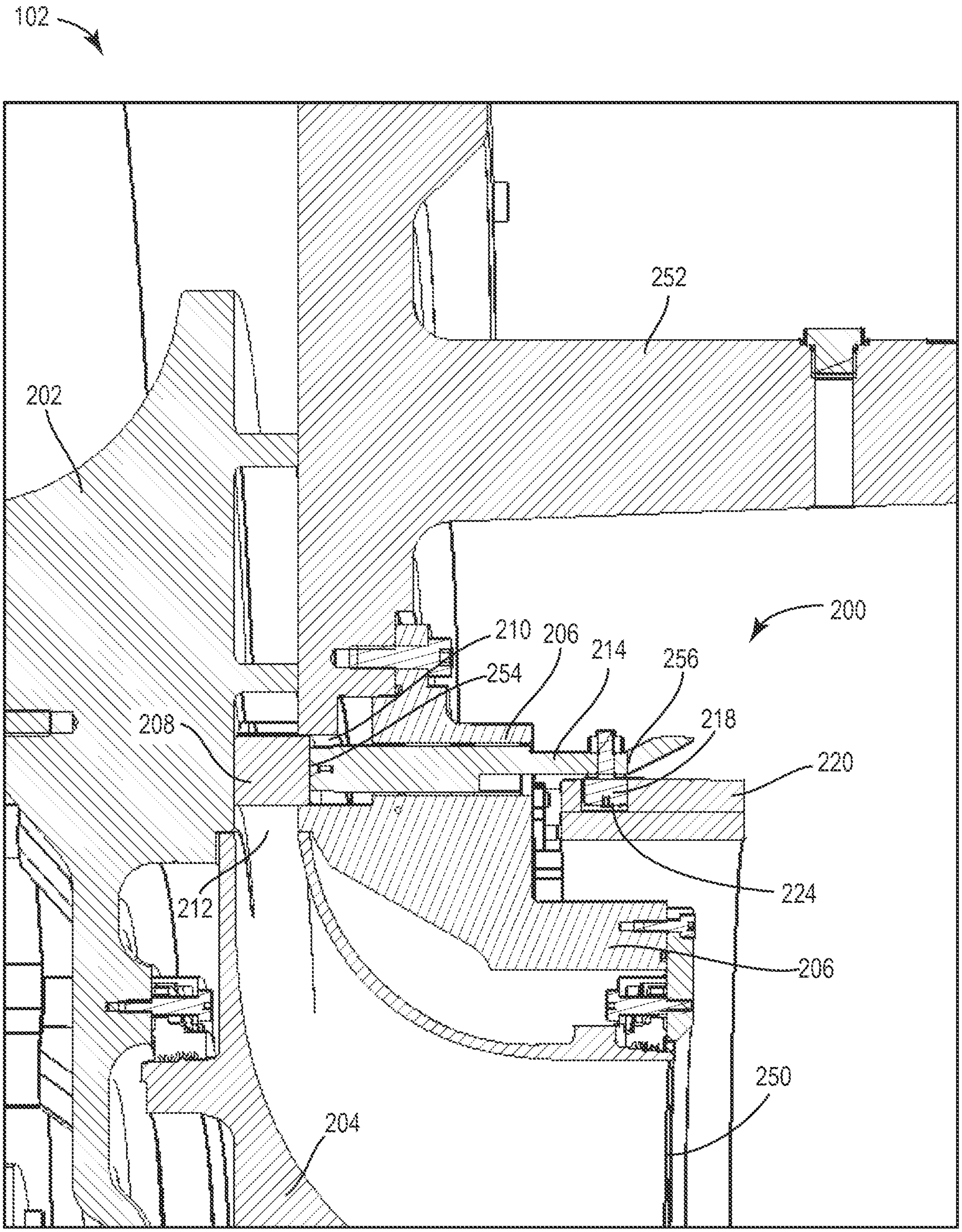
FIG. 4 is a sectional view drawing of a variable geometry diffuser (VGD) used in a centrifugal compressor, according to some embodiments.

Referring now to FIG. 4, a sectional view drawing of the VGD 200 in the compressor 102 is depicted, according to some embodiments. As shown, compressor 102 may include a diffuser plate 202, an impeller 204, a nozzle base plate 206, and a suction plate housing 252. In some embodiments, the diffuser plate 202 is integral with a component of the compressor housing (not shown). In other embodiments, the diffuser plate 202 is detachably coupled to the compressor housing with fasteners. Diffuser plate 202 is shown to be positioned opposite the nozzle base plate 206 and the suction plate housing 252. The nozzle base plate 206, described in further detail below with reference to FIGS. 6-8, may be detachably coupled to the suction plate housing 252 with fasteners. The suction plate housing 252 may be coupled to a suction inlet pipe or another component of the compressor housing to form an inlet passage for the refrigerant. In various embodiments, the diffuser plate 202, the nozzle base plate 206, and the suction plate housing 252 are fabricated using a casting or a machining process.

Rotation of impeller 204 imparts work to the fluid, thereby increasing its pressure. As described above, in some embodiments, the impeller 204 is a high specific speed VGD. The fluid is typically a refrigerant, entering at the impeller inlet 250. After travelling through the impeller 204, refrigerant of higher velocity exits the impeller 204 and passes through diffuser gap 212 as it is directed to a collector or volute and ultimately to the compressor exit.

A diffuser ring 208 is assembled into a groove 210. In some embodiments, the groove 210 is machined into a surface of the nozzle base plate 206 and/or the suction plate housing 252. In other embodiments, the groove 210 is formed by the geometry of the nozzle base plate 206 and the suction plate housing 206 when the components are coupled to each other. Diffuser ring 208 is movable away from groove 210 and into the diffuser gap 212 that separates diffuser plate 202 and nozzle base plate 206. In the completely retracted position, diffuser ring 208 is nested in the groove 210 and diffuser gap 212 is in a condition of maximum flow. In the completely extended position (as depicted in FIG. 4), diffuser ring 208 extends substantially across diffuser gap 212, essentially closing diffuser gap 212. The diffuser ring 208 can be moved to any position intermediate the completely retracted position and the completely extended position. In some embodiments, diffuser ring 208 has a generally annular shape and a rectangular cross-section, although diffuser ring 208 may have any cross-section (e.g., L-shaped) to achieve desired flow characteristics through the diffuser gap 212.

Diffuser ring 208 is attached (e.g., via fasteners) to a plurality of drive pins 214. Each drive pin 214 includes a first end 254 and a second end 256. In various embodiments, the first end 254 of the drive pin 214 may be bolted, welded or brazed into the diffuser ring 208. In further embodiments, the drive pin 214 may be fixedly connected to diffuser ring 208 by a threaded portion on the first end 254 of the drive pin 214 that threads into a threaded hole on the annular diffuser ring 208. Each drive pin 214 includes an aperture on the second end 256 that is used to couple the drive pin 214 to a cam follower 218. Further details of the cam follower 218 are included below with reference to FIG. 8.

Figure 5:
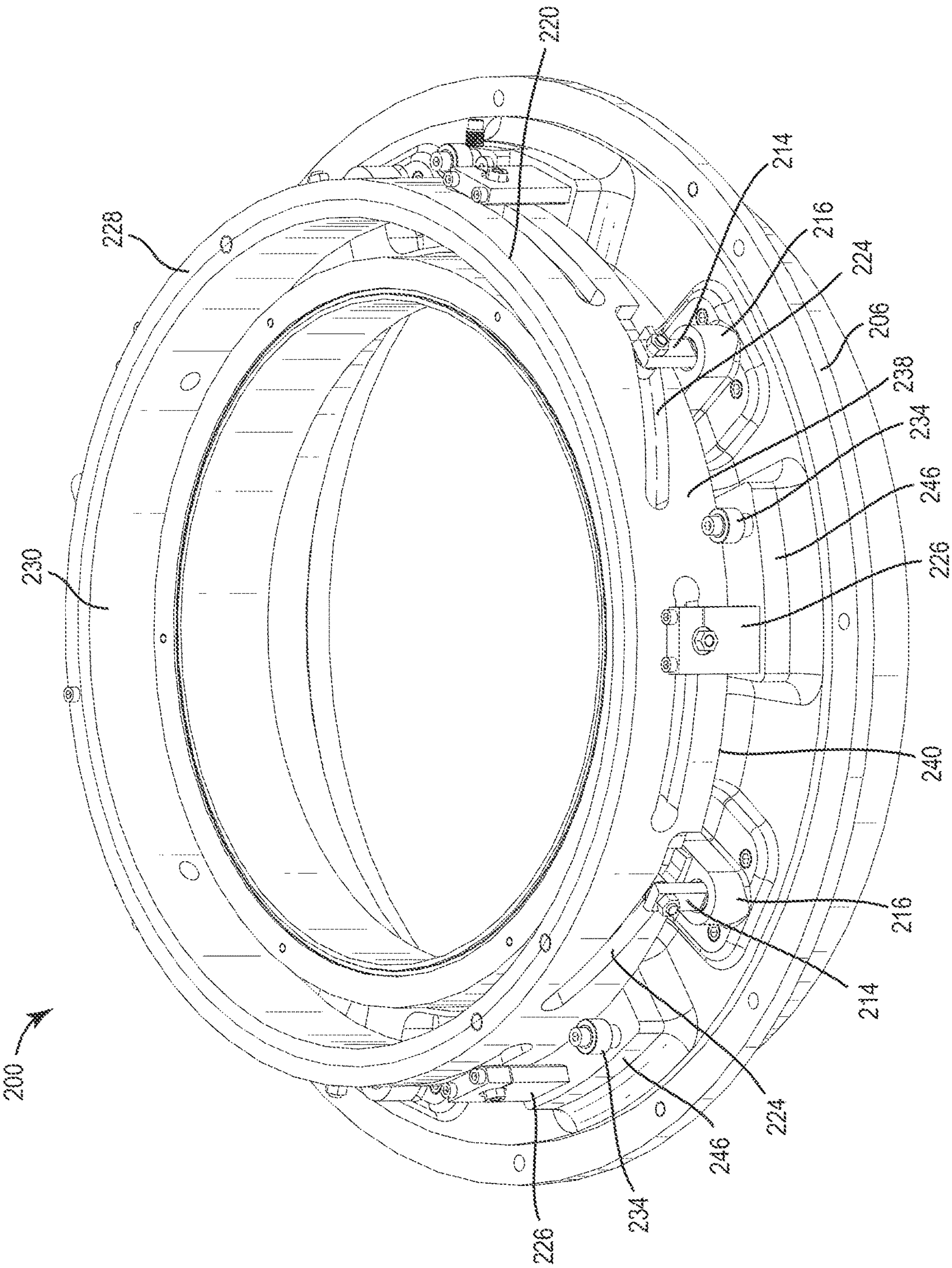
FIG. 5 is a perspective view drawing of a nozzle base plate and drive ring subassembly of the VGD of FIG. 3, according to some embodiments.
Figure 6:
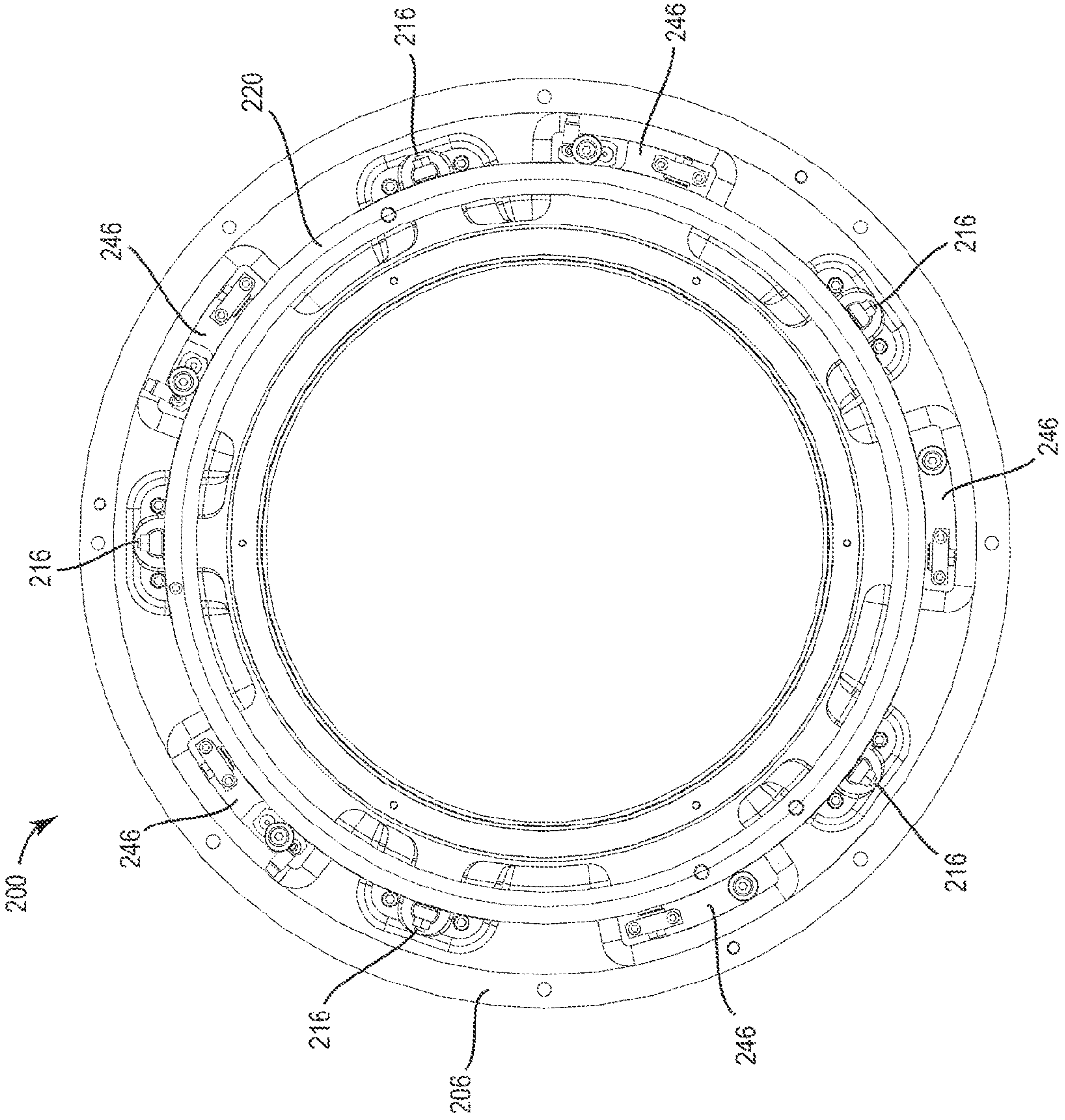
FIG. 6 is a perspective view drawing of nozzle base plate and drive ring subassembly of FIG. 5, according to some embodiments.
Figure 7:
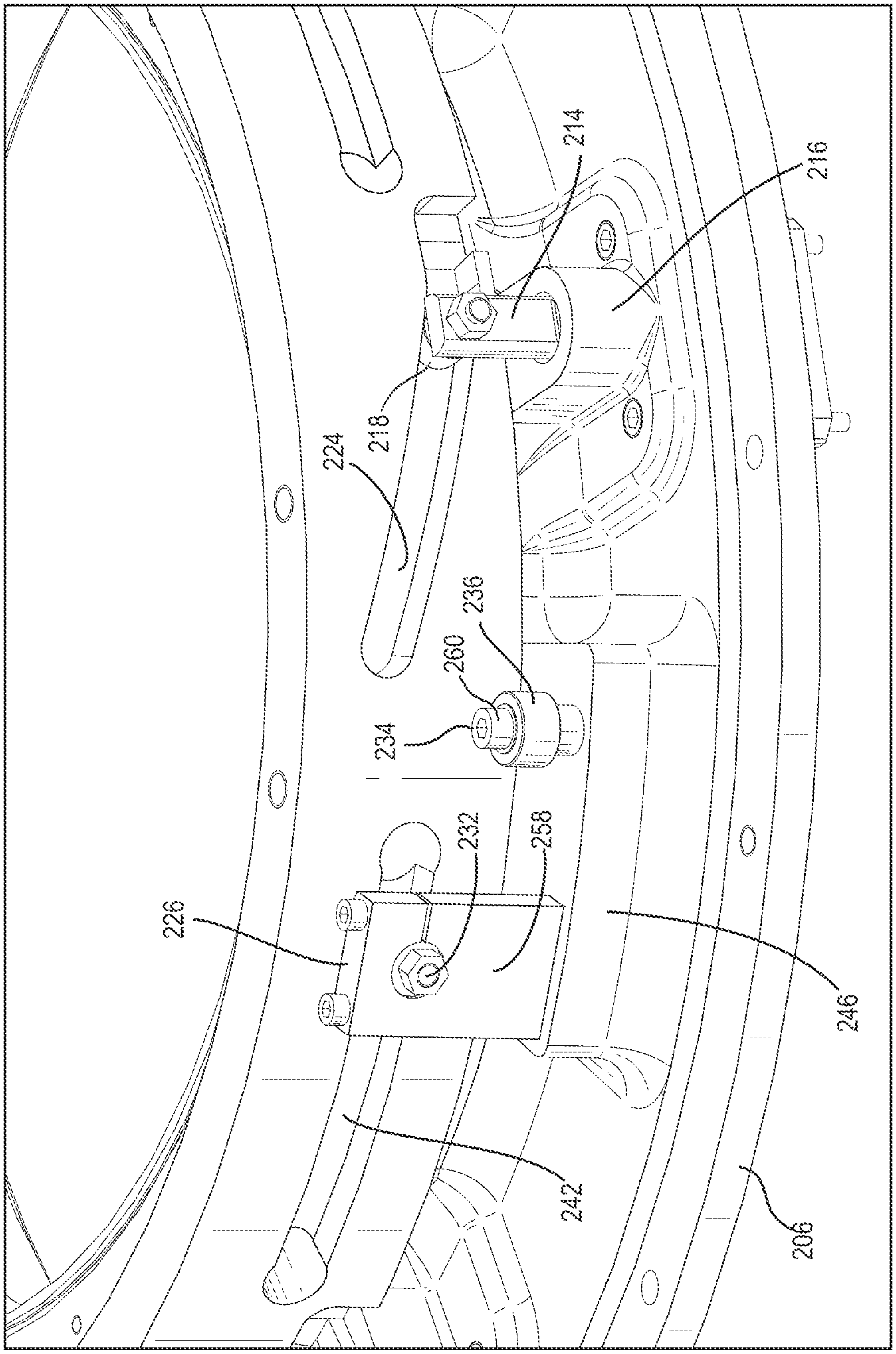
FIG. 7 is a detail view drawing of the nozzle base plate and drive ring subassembly of FIG. 5, according to some embodiments.

Turning now to FIGS. 5-7, perspective and elevation view drawings of the nozzle base plate 206 and the drive ring 220 of the VGD 200 of FIG. 4 are depicted, according to some embodiments. As shown, drive ring 220 is generally annular in shape and includes a top surface 228, an inner circumferential surface 230, an outer circumferential surface 238, and a bottom surface 240. When installed in the compressor 102, the VGD 200 may be oriented such that the top surface 228 of the drive ring 220 is located proximate the suction inlet of the compressor 102 and the bottom surface 240 of the drive ring 220 is located proximate the diffuser gap 212, as described above with reference to FIG. 4. Drive ring 220 is assembled onto support blocks 216 and 246 which extend underneath drive ring 220. In some implementations, support blocks 216 and 246 are integrally formed with the nozzle base plate 206 (e.g., using a casting or machining process). In other implementations, support blocks 216 and 246 are fabricated as separate components that are later assembled to nozzle base plate 206 (e.g., using fasteners such as bolts or pins).

Support blocks 216 may facilitate the connection of the diffuser ring 208 to the drive ring 220 using the drive pins 214, while support blocks 246 may accommodate both axial bearing assemblies 232 and radial bearing assemblies 234. As shown specifically in FIG. 6, support blocks 216 and 246 may be alternated about the nozzle base plate 206 such that each support block 216 includes a support block 246 on either side, and vice versa. In the implementation depicted in FIG. 6, VGD 200 includes five support blocks 216 and five support blocks 246, therefore VGD 200 includes five drive pins 214, five axial bearing assemblies 232, and five radial bearing assemblies 234. As the support blocks 216 and 246 may be equally distributed about the nozzle base plate 206, each support block 216 and 246 may be located at approximate intervals (e.g., ±10%) every 72° apart. In other embodiments, the VGD may include a different number of support blocks 216 and 246, and a corresponding different number of drive pins 214, axial bearing assemblies 232, and radial bearing assemblies 234.

Drive pins 214 are assembled into the support blocks 216 and extend down through nozzle base plate 206. Because drive pins 214 extend through holes in the nozzle base plate 206 and because the nozzle base plate 206 is attached to suction plate housing 252, drive pins 214 prevent rotational movement of the diffuser ring 208. The drive pins 214 are coupled to cam followers 218 which are assembled into cam tracks 224. For example, a cam follower 218 may be assembled through an aperture in the drive pin 214 and secured to the drive pin 214 with a nut. In other embodiments, another attachment method (e.g., a lock pin arrangement) may be utilized to secure cam follower 218 to drive pin 214, so long as cam follower 218 is free to rotate relative to drive pin 214. Cam tracks 224 are grooves fabricated into the outer circumferential surface 238 of the drive ring 220. Each cam track 224 may be fabricated at a preselected depth and at a preselected width to receive a cam follower 218, and may correspond and mate with a support block 216. Thus, in the implementation depicted in FIG. 6, drive ring 220 would have five cam tracks 224 that correspond to the five support blocks 216.

Referring specifically to FIG. 7, a perspective view of axial bearing assembly 226 and radial bearing assembly 234 is depicted. Axial bearing assembly 226 comprises a support structure 258 for the axial bearing 232 and attachment means (not shown) to secure the support structure 258 to support block 246. Any suitable means (e.g., a nut) may be used to secure the axial bearing 232 to the support structure 258. Axial bearing 232 is assembled into axial cam track 242, described in further detail below with reference to FIG. 10. Axial bearing 232 resists axial movement of drive ring 220 as it rotates. In some implementations, axial bearing 232 also permits small adjustments to the axial location of the drive ring 220. Any other suitable axial bearing assembly may be utilized that can resist axial movement of the drive ring 220 as it rotates.

FIG. 7 also shows radial bearing assembly 234 installed onto support block 246. Radial bearing assembly 234 includes a roller 236. The roller 236 may be secured to the support block 246 using a partially threaded shaft 260, although roller 236 may be permitted to freely rotate relative to partially threaded shaft 260. The radial bearing assembly 234 resists radial movement of the drive ring 220 as it rotates. Any other suitable radial bearing assembly may be utilized that can resist radial movement of the drive ring 220 as it rotates.

Operation of the VGD 200 may proceed as follows: when a stall or surge condition is detected (e.g., by a sensor) within the compressor 102, an actuating means (e.g., actuator 126) causes rotation of the drive ring 220. Drive ring 220 is restricted to rotational movement in the plane in which it resides over support blocks 216 and 246. As drive ring 220 rotates, each of the cam followers 218 moves from a first position in cam tracks 224 where the cam track grooves are proximate the top surface 228 of drive ring 220 along the tracks toward bottom surface 240 of drive ring 220. As the drive ring 220 and cam tracks 224 rotate, cam followers 218 are forced downward along the tracks 224. As the followers 218 move downward, drive pins 214 move into support blocks 216. Since diffuser ring 208 is attached to the opposite end of drive pin 214 (i.e., the first end 254 of drive pin 214) on the opposite side of nozzle plate 206, the movement of drive pin 214 into support block 216 moves the first end 254 of drive pin 214 away from the groove 210, causing diffuser ring 208 to move into diffuser gap 212. Depending on the control system, the actuator or other actuating means may stop the rotation of drive ring 220 at any position intermediate between a fully retracted and fully extended position of the actuating means. This in turn results in the diffuser ring 208 being stopped in any position between a fully extended position and a fully retracted position within groove 210.

Figure 8:
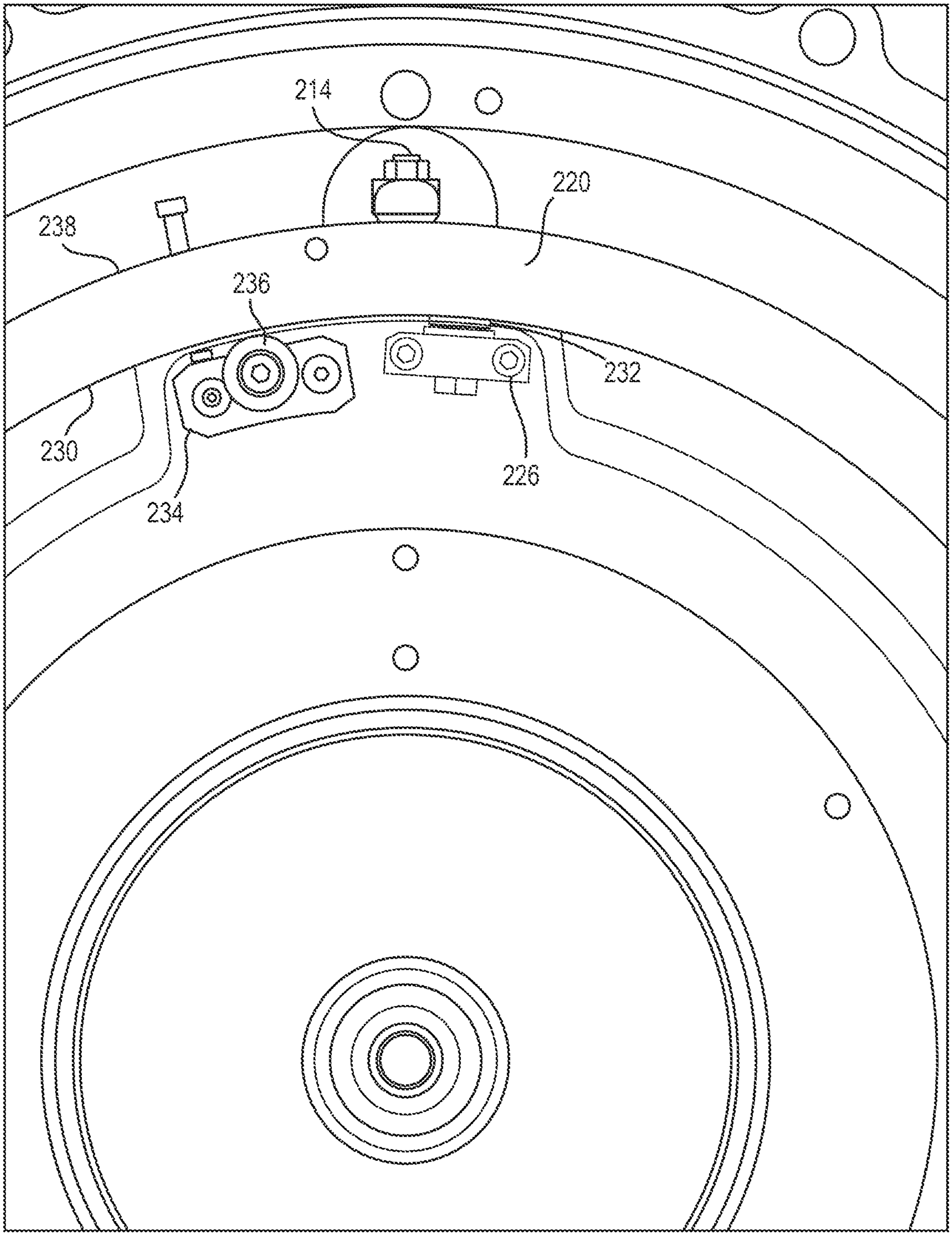
FIG. 8 is a detail view drawing of a non-compact design VGD, according to some embodiments.

Referring now to FIG. 8, a detail view drawing of a non-compact implementation of the VGD 200 is depicted. For example, the implementation of FIG. 8 may be utilized with a low specific speed impeller, in which the ratio of the diameter of the widest portion of the impeller (i.e., the tip) to the diameter of the eye of the impeller is relatively large (e.g., approximately 3.0). As shown, drive ring 220 is assembled to a support block 216 with a radial bearing assembly 234 and an axial bearing assembly 226. Both the radial bearing assembly 234 having roller 236 and the axial bearing assembly 226 having axial bearing 232 are installed on the inner circumferential surface 230 of the drive ring 220. By contrast, drive pin 214 is installed on the outer circumferential surface 238 of the drive ring 220.

Figure 9:
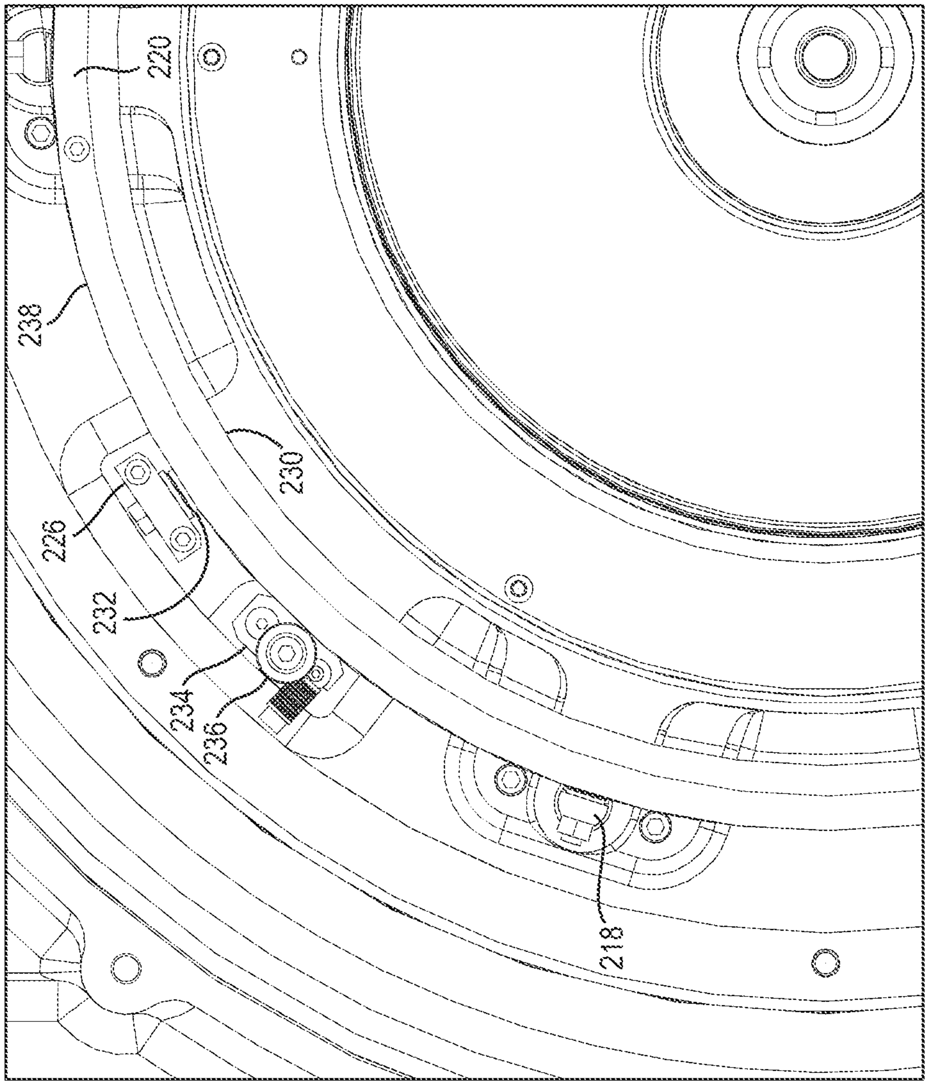
FIG. 9 is a detail view drawing of a compact design VGD, according to some embodiments.

Referring now to FIG. 9, a detail view drawing of a compact implementation of the VGD 200 is depicted. In contrast to the implementation depicted in FIG. 8, the VGD depicted in FIG. 9 (as well as FIGS. 4-7) may be utilized with a high specific speed impeller, in which the diameter of the widest portion of the impeller to the diameter of the eye of the impeller is relatively small (e.g., approximately 1.5). As shown, drive ring 220 is assembled to a support block 216 with a radial bearing assembly 234 and an axial bearing assembly 226. Unlike the configuration described above with reference to FIG. 8, the configuration of FIG. 9 includes each of the drive pin 214, the radial bearing assembly 234 having roller 236, and the axial bearing assembly 226 having axial bearing 232 installed on the outer circumferential surface 238 of the drive ring 220. As described above, the configuration depicted in FIG. 9 is optimal for use in a VGD in which the size of the impeller eye limits the available space within the area enclosed by the inner circumferential surface 230. By relocating the radial bearing assembly 234 and the axial bearing assembly 226 to the outer circumferential surface 238 of drive ring 220, the space utilized by the VGD 200 is optimized.

Figure 10:
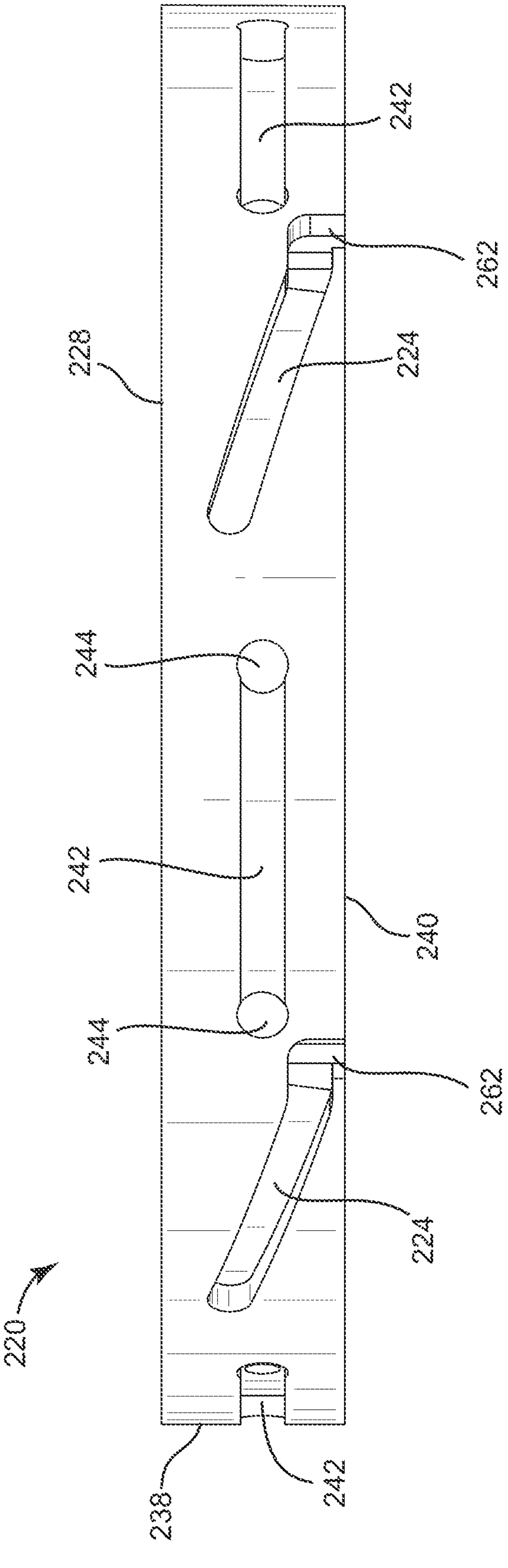
FIG. 10 is an elevation view drawing of a drive ring used in the compact design VGD of FIG. 9, according to some embodiments.

Turning now to FIG. 10, an elevation view of the drive ring 220 is depicted, according to some embodiments. Drive ring 220 is shown to include multiple cam tracks 224 and 242 distributed on the outer circumferential surface 238 of the drive ring 220, and thus may be utilized with the compact VGD design depicted in FIGS. 4-7 and 9. Cam tracks 224 are shown to extend from a bottom surface 240 of the drive ring 220 toward a top surface 228 of the drive ring 220, extending at an angle between these surfaces, and preferably in a substantially straight line. At the end of the cam track 224 proximate the bottom surface 240 of the drive ring 220, the track includes a portion 262 that extends to bottom surface 240 to provide access for assembly of cam follower 218 into cam track 224. The distance that the cam track 224 extends parallel to the axis of the drive ring 220 corresponds substantially to the width of the diffuser gap 212. The angle of the cam track 224 can be any preselected angle. As the angle becomes shallower, control of the drive ring 220 and correspondingly, the diffuser ring 208 becomes more precise.

The axial cam tracks 242 are shown to extend in a substantially parallel direction to the top surface 228 and the bottom surface 240 of the drive ring 220. Each cam track 242 may be fabricated at a preselected depth and at a preselected width to receive an axial bearing 232. In addition, each cam track 242 may terminate at either end in a circular cut 244. The circular cuts 244 may facilitate removal of the tool used to cut axial cam tracks 242.

As shown, the axial cam tracks 242 may be located or "nested" in the axial space occupied by the cam tracks 224. This configuration reduces both the axial dimensions of the drive ring 220 and the VGD 200 overall. In addition, the dimensions of cam tracks 224 and 242 (e.g., width, depth) may optimize the fabrication process of drive ring 220. For example, cam tracks 224 and 242 may be shaped using a milling process, and the same milling tool may be utilized to cut both cam tracks 224 and 242. Use of an identical milling tool for both cam tracks 224 and 242 may lead to greater accuracy in the finished part, since fewer machine tool setups are required.

Figure 11:
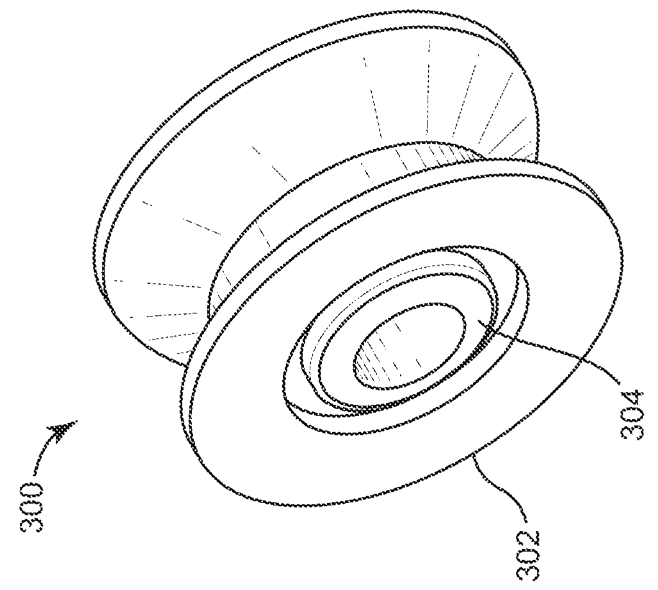
FIG. 11 is a perspective view drawing of a V-groove cam follower bearing, according to some embodiments.

Referring now to FIG. 11 a perspective view of a V-groove cam follower bearing 300 is depicted, according to some embodiments. In various embodiments, the V-groove cam follower bearing 300 may be used in place both of the axial bearing assembly 226 and the radial bearing assembly 234 because the geometry of the V-groove bearing 300 is able to restrict movement in both radial and axial directions simultaneously. As shown, bearing 300 includes an outer ring 302 and an inner ring 304. Outer ring 302 may include two symmetrical flanges extending in a V-shaped cross-section. Inner ring 304 may include any type of suitable rolling elements (e.g., balls, rollers, cones, needles) such that outer ring 302 is permitted to rotate freely relative to inner ring 304.

Figure 12:
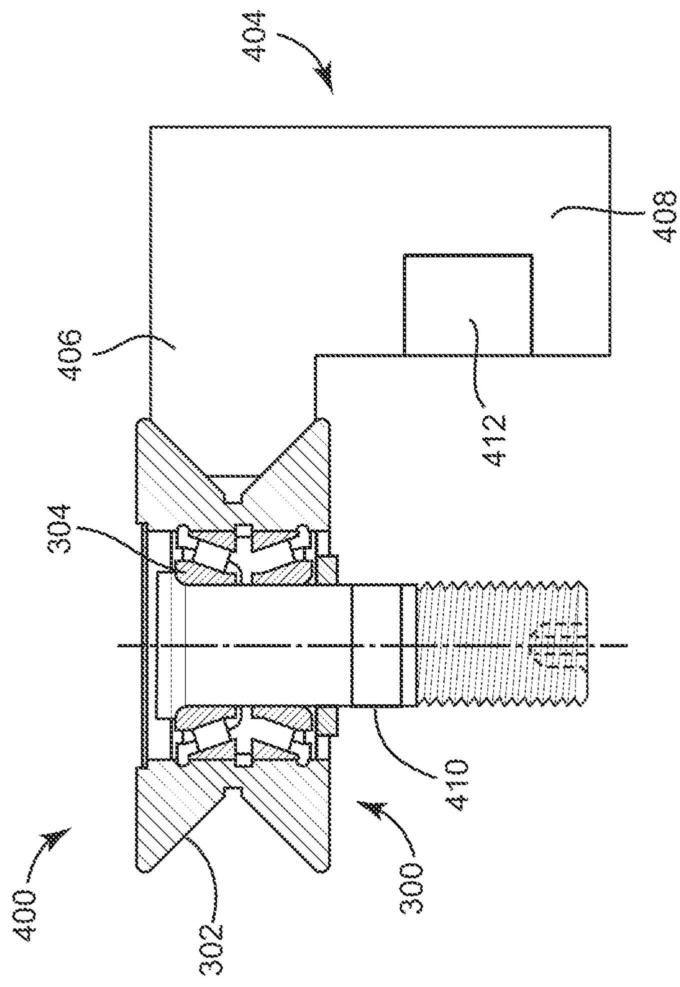
FIG. 12 is a sectional view drawing of a V-groove cam follower bearing and drive ring assembly, according to some embodiments.

FIG. 12 depicts a sectional view of a V-groove cam follower bearing and drive ring assembly 400. In various embodiments, assembly 400 is a subcomponent of a VGD, including VGD 200 described above with reference to FIGS. 4-11. As shown, assembly 400 includes a V-groove cam follower bearing 300 and a drive ring 404 that is adapted to operate with a V-groove type bearing. The drive ring 404 may have a substantially annular shape with an L-shaped cross section comprised of an extension portion 406 and a base portion 408. Extension portion 406 and base portion 408 may be situated orthogonally relative to each other. Base portion 408 may include a cam track 412 of any dimensions required to receive a cam follower (e.g., cam follower 218, not shown).

Bearing 300 may be secured to another component of the VGD (e.g., a support block) using a fastener 410 (e.g., a bolt). Fastener 410 may be used to locate bearing 300 such that both flanges of the outer ring 302 contact the extension portion 406 of the drive ring 404. In this way, bearing 300 may be utilized to constrain the motion of the drive ring 404 in both an axial and a radial direction.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. A diffuser system for a compressor, the diffuser system comprising:
- a nozzle base plate configured to at least partially define a diffuser gap;
- a drive ring comprising a plurality of first cam tracks and a plurality of second cam tracks formed in an outer circumferential surface of the drive ring;
- a diffuser ring coupled to the drive ring via a plurality of drive pins extending through the nozzle base plate, wherein a first end of each drive pin includes a cam follower positioned within a respective first cam track of the plurality of first cam tracks, and a second end of each drive pin is coupled to the diffuser ring; and
- at least one bearing assembly disposed about the outer circumferential surface of the drive ring.

2. The diffuser system of claim 1, comprising a plurality of support blocks extending from a side of the nozzle base plate opposite the diffuser gap, wherein each drive pin of the plurality of drive pins is configured to extend through a corresponding support block of the plurality of support blocks.

3. The diffuser system of claim 2, wherein the drive ring is rotatable between a first position and a second position relative to the plurality of support blocks, and wherein rotation of the drive ring causes adjustment of a diffuser ring position of the diffuser ring relative to the diffuser gap.

4. The diffuser system of claim 3, wherein the second position of the drive ring corresponds to a fully closed position of the diffuser ring within the diffuser gap, and the diffuser ring is configured to prevent flow of a fluid through the diffuser gap in the fully closed position.

5. The diffuser system of claim 1, wherein the drive ring comprises a plurality of bearing assemblies disposed about the outer circumferential surface of the drive ring, and the plurality of bearing assemblies includes the at least one bearing assembly.

6. The diffuser system of claim 5, wherein the plurality of bearing assemblies comprises an axial bearing assembly and a radial bearing assembly.

7. The diffuser system of claim 6, wherein the radial bearing assembly comprises a roller member in contact with the outer circumferential surface of the drive ring, and the roller member is configured to resist radial movement of the drive ring.

8. The diffuser system of claim 6, wherein the axial bearing assembly comprises a bearing member extending within a second cam track of the plurality of second cam tracks on the drive ring, and wherein the bearing member is configured to resist axial movement of the drive ring.

9. The diffuser system of claim 1, wherein each first cam track of the plurality of first cam tracks is angled relative to a top surface and a bottom surface of the drive ring, and wherein each second cam track of the plurality of second cam tracks is substantially parallel to the top surface and the bottom surface of the drive ring.

10. The diffuser system of claim 1, wherein a second axial dimension of a second cam track of the plurality of second cam tracks is within a respective first axial dimension of a first cam track of the plurality of first cam tracks extending between a top surface and a bottom surface of the drive ring.

11. A compressor, comprising:
- a housing;
- an impeller rotatably mounted in the housing and configured to compress fluid received by the compressor; and
- a diffuser system mounted in the housing and configured to modulate a flow of the fluid through the compressor, wherein the diffuser system comprises:
  - a nozzle base plate at least partially defining a diffuser gap;
  - a drive ring comprising a plurality of first cam tracks and a plurality of second cam tracks formed in an outer circumferential surface of the drive ring;
  - a diffuser ring coupled to the drive ring via a plurality of drive pins extending through the nozzle base plate, wherein a first end of each drive pin includes a cam follower positioned within a respective first cam track of the plurality of first cam tracks, and a second end of each drive pin is coupled to the diffuser ring; and
  - at least one bearing assembly disposed about the outer circumferential surface of the drive ring.

12. The compressor of claim 11, wherein the diffuser system comprises a plurality of support blocks extending from a side of the nozzle base plate opposite the diffuser gap, wherein the drive ring is configured to rotate relative to the plurality of support blocks, and wherein each drive pin of the plurality of drive pins extends into a respective support block of the plurality of support blocks and is configured to translate relative to the respective support block during rotation of the drive ring.

13. The compressor of claim 12, wherein the nozzle base plate comprises a surface opposite the side of the nozzle base plate and adjacent the diffuser gap, the surface comprises a groove formed therein and configured to at least partially receive the diffuser ring, and the plurality of drive pins is configured to adjust a position of the diffuser ring relative to the groove and relative to the diffuser gap during rotation of the drive ring.

14. The compressor of claim 12, wherein the plurality of support blocks is a plurality of first support blocks, the diffuser system comprises a plurality of second support blocks extending from the side of the nozzle base plate opposite the diffuser gap, and each second support block of the plurality of second support blocks is configured to support:
- an axial bearing assembly disposed about the outer circumferential surface of the drive ring and configured to resist axial movement of the drive ring;
- a radial bearing assembly disposed about the outer circumferential surface of the drive ring and configured to resist radial movement of the drive ring; or
- both.

15. The compressor of claim 11, wherein the compressor is a centrifugal compressor and the impeller is a high specific speed impeller.

16. A variable geometry diffuser system, comprising:
- a diffuser ring configured to extend into a diffuser gap of a compressor to adjust fluid flow through the compressor;
- a plurality of drive pins secured to the diffuser ring;
- a drive ring comprising a plurality of cam tracks formed in an outer circumferential surface of the drive ring; and
- a plurality of bearing assemblies disposed only about the outer circumferential surface of the drive ring,
- wherein each drive pin of the plurality of drive pins is configured to engage with a respective cam track of the plurality of cam tracks, each drive pin is configured to translate within the respective cam track of the plurality of cam tracks during rotation of the drive ring, and the plurality of drive pins is configured to adjust a position of the diffuser ring relative to the diffuser gap during rotation of the drive ring.

17. The variable geometry diffuser system of claim 16, wherein the plurality of bearing assemblies comprises an axial bearing assembly and a radial bearing assembly.

18. The variable geometry diffuser system of claim 17, comprising a nozzle base plate including a support block, wherein the nozzle base plate is configured to at least partially define the diffuser gap, and the axial bearing assembly and the radial bearing assembly are secured to the support block.

19. The variable geometry diffuser system of claim 18, wherein the nozzle base plate comprises a plurality of second support blocks, each drive pin of the plurality of drive pins extends into a respective second support block of the plurality of second support blocks and through the nozzle base plate to couple to the diffuser ring, and each drive pin of the plurality of drive pins is configured to translate within the respective second support block during rotation of the drive ring.

20. The variable geometry diffuser system of claim 18, wherein the plurality of cam tracks is a plurality of first cam tracks, the drive ring comprises a second cam track formed in the outer circumferential surface, the axial bearing assembly comprises an axial bearing configured to engage the second cam track, and each first cam track of the plurality of first cam tracks is angled relative to the second cam track.

* * * * *